United States Patent [19]

Stolpe

[11] 4,024,961
[45] May 24, 1977

[54] INDUSTRIAL ROBOT COMPRISING A CONTROL SYSTEM

[75] Inventor: Jens Torvald Stolpe, Hudiksvall, Sweden

[73] Assignee: Hiab-Foco Aktiebolag, Hudiksvall, Sweden

[22] Filed: Oct. 14, 1975

[21] Appl. No.: 621,758

[30] Foreign Application Priority Data

Oct. 14, 1974 Sweden ............................ 7412880

[52] U.S. Cl. ......................... 214/1 BD; 214/1 CM; 214/147 T
[51] Int. Cl.² ....................................... G05B 19/42
[58] Field of Search .............. 214/1 CM, 77 R, 78, 214/79, 80, 147 T, 1 BD, 1 BV

[56] References Cited

UNITED STATES PATENTS

| | | | |
|---|---|---|---|
| 2,772,793 | 12/1956 | Brusewitz | 214/80 X |
| 3,648,143 | 3/1972 | Harpu et al. | 214/1 CM X |
| 3,880,304 | 4/1975 | Strickland, Jr. | 214/1 CM X |

*Primary Examiner*—L. J. Paperner
*Assistant Examiner*—George F. Abraham
*Attorney, Agent, or Firm*—Newton, Hopkins & Ormsby

[57] ABSTRACT

In an industrial robot incorporating a control system by means of which the robot may repeat automatically a desired movement pattern, two hydraulic cylinders to pivot the robot pivotable arms in a vertical plane. The hydraulic cylinders are interconnected by an articulation means which may be disconnected from the robot arms so as not to take part in the arm movements during programming, but again be connected to the robot arms to allow the associated hydraulic cylinders to perform their function when the robot is to operate according to the chosen programme.

3 Claims, 6 Drawing Figures

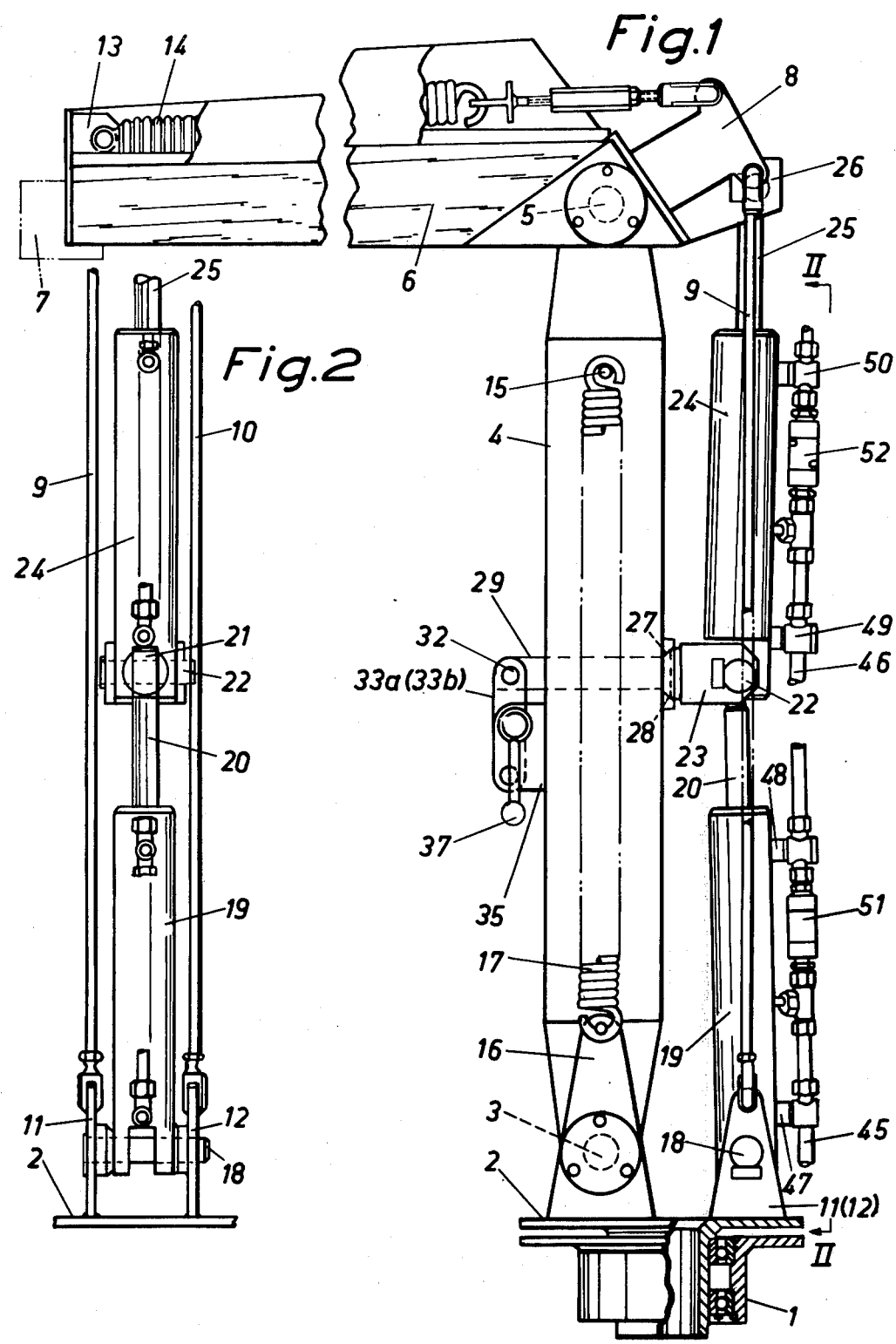

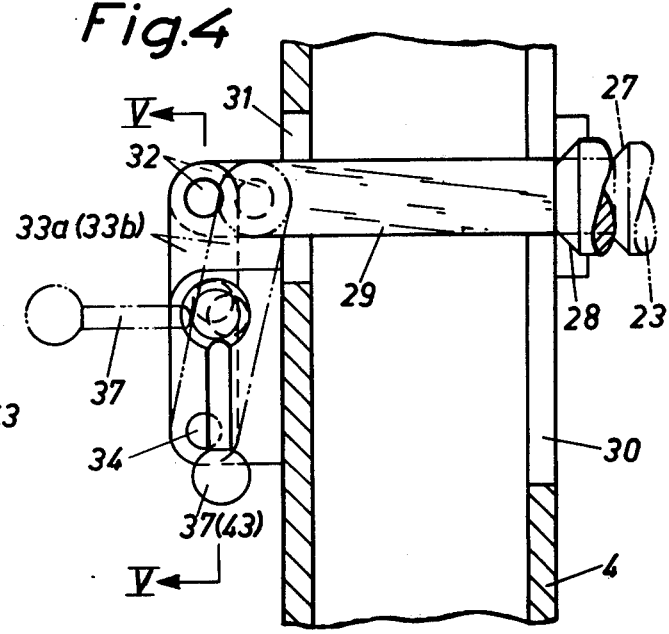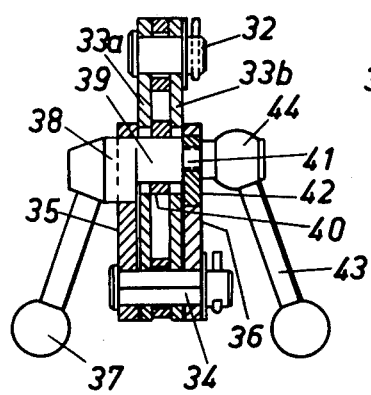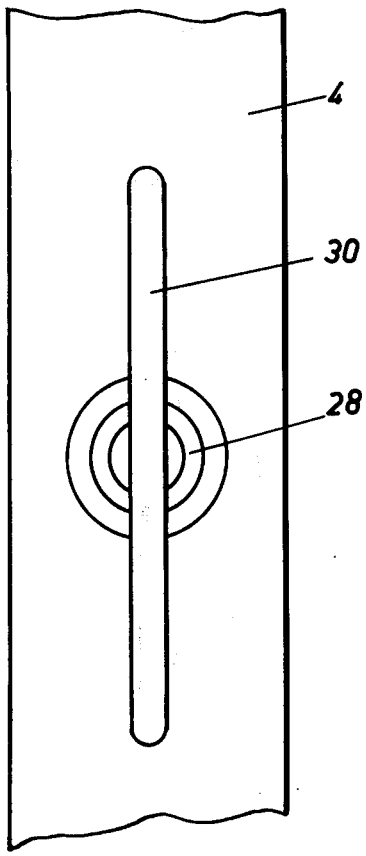

INDUSTRIAL ROBOT COMPRISING A CONTROL SYSTEM

BACKGROUND OF THE INVENTION

The present invention concerns an industrial robot or so-called manipulator which is arranged, with the aid of a programme control, to repeat automatically a pattern of movements which the robot, operated manually has performed once. It is primarily intended for surface coating operations but may also be used for other purposes, such as polishing, grinding and the like, and in all operations where it is desired to repeat a movement pattern in an identical manner and a number of times.

Teaching of the movement is effected by running the tool attachment and thus also all the movable parts of the robot manually through the movement pattern.

The tool attachment which is provided with a so-called hand, is capable of performing three movements (turning in two different planes which are at right angles to one another, and rotation, simulating the possibilities of movement of the human hand). The tool, e.g. a spray gun, is secured in the tool attachment. The detailed design of the "hand" does not form part of the present invention and consequently will not be described in detail herein.

When the robot is to be programmed, e.g. for spray painting, the spray painter moves the gun in the desired movement pattern during the painting of the article and during this operation the movements of the "hand" and the arm system are registered in the memory of the control system. It is thereafter possible to paint identical articles in an automatic manner with the aid of the control system thus programmed.

In order to prevent that the task of the operator is unnecessarily disturbed or hampered during the programming proper by the large weights that need to be handled and by the resistance to movement inherent in the arm system itself, the weight of the latter must be balanced and the resistance to movement in joints and drive means be kept at a low level. The balancing of the arm system is in the present case effected by spring means.

When the arm system, thus blanced, is moved through the movement pattern by the operator, the hydraulic cylinders which drive the arm system during the automatic operation, will take part in the movement during the programming. The cylinders in themselves exhibit frictional resistance in gaskets and similar means, in addition to which the displacement of the oil quantities in the cylinders means further resistance. It is alreadly known to reduce the latter resistance by providing the hydraulic cylinders with a so-called by-pass valve which hydraulically short-circuits the hydraulic connections to the various cylinders during the programming operation.

This reduces the work to transfer of the oil quantity from the piston to the piston rod side and vice versa and to "dumping" (discharge) and replenishing, respectively, to or from the tank in question of the small quantity of oil which constitutes the volumeric difference between the piston and piston rod sides.

This principle is applied also to the robot in accordance with the present invention which is of the kind comprising a bracket which is arranged to turn relative to a support, a pivotally mounted crane boom the lower end of which is journalled on a horizontal shaft on said bracket, a jib one end of which is pivotally mounted about a horizontal shaft at the upper end of the crane boom, said jib supporting a tool attachment, a hydraulic cylinder arranged between the bracket and the crane boom to effect the pivotal movement of the crane boom in a vertical plane and a hydraulic cylinder inserted between the crane boom and the jib to pivot the jib in the same vertical plane, and a device comprising a spring means to balance the crane boom and the jib. This principle has, however, been found insufficient as the resistance to movement still is too strong.

SUMMARY OF THE INVENTION

In accordance with the present invention the system is supplemented with a device arranged during the programming to disconnect the cylinders mechanically from the arm system in such a manner that particularly the crane boom cylinder is prevented from taking part in the crane boom movements over the larger part of the area of work of the crane boom. This cylinder is the most critical one, as the lever relationship between the crane boom movement and the crane boom cylinder movement is very unfavourable.

It is characteristic of the invention that the two piston-and-cylinder units arranged to perform the pivotal movement of the crane boom relative to the support bracket and the pivotal movement of the jib relative to the crane boom are interconnected by means of an articulation piece arranged to be disconnected from the crane boom when the control system is to be programmed and to be again connected to the crane boom when the robot is to work in accordance with the chosen programme. Owing to this possibility of disconnecting the articulation piece from the crane boom it becomes possible to lower the latter without the pistons moving in the associated cylinders. The crane boom and the two piston-and-cylinder units which are positioned in the direction of extension of one another, after said disconnection function as two parallel sides in a parallelogramm of movements.

BRIEF DESCRIPTION OF THE DRAWINGS

Further characteristics of the invention will appear from the following description with reference to the accompanying drawings, wherein FIG. 1 is a partly broken side view of a robot in accordance with the present invention, FIG. 2 is a vertical view along line II—II of FIG. 1, FIG. 4 illustrates on an enlarged scale a vertical section through the crane boom at the articulation point between the hydraulic cylinders in question, FIG. 5 is a cross-sectional view along line V—V of FIG. 4, and FIG. 6 is a side view of the crane boom in accordance with FIG. 4 as seen from the right.

DETAILED DESCRIPTION OF A PREFERRED EMBODIMENT

Figure 3:
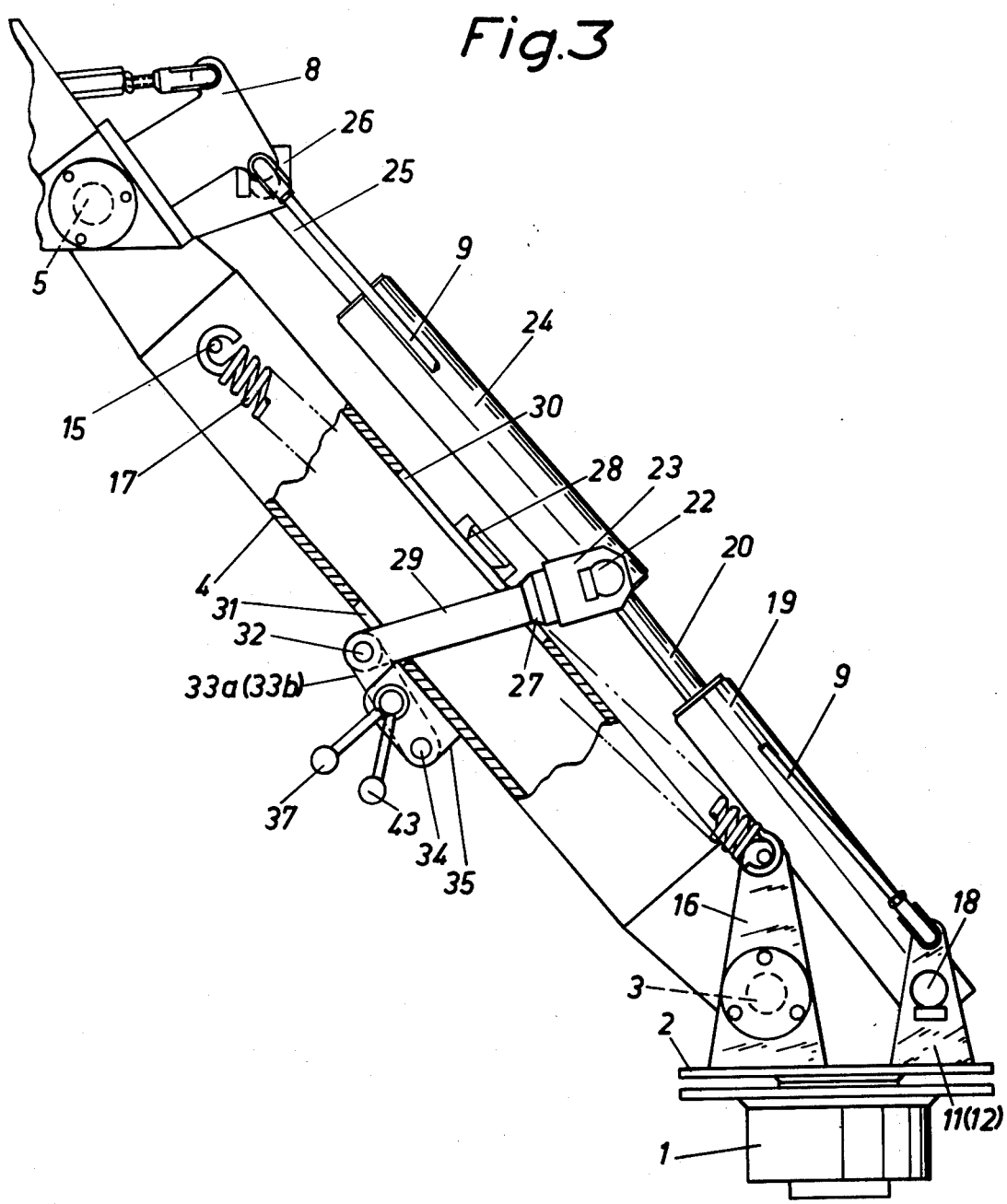
FIG. 3 is a side view similar to the one illustrated in FIG. 1 but showing the the robot crane boom in a forwardly tilted position.

The robot comprises a bracket 2 which is arranged for turning movement relative to a support, which may be in the form of a support sleeve 1, said bracket having a horizontal shaft 3 about which the lower end of the robot crane boom 4 is pivotally mounted. About a shaft 5 disposed at the upper end of the crane boom 4 is pivotally mounted a jib 6, the articulation point being located close to the inner jib end whereas the outer jib end supports a tool attachment 7 (in FIG. 1 merely indicated schematically in dash-and-dot lines). A link arm 8 is pivotally mounted about the shaft 5 for pivotal movement in a vertical plane (the same vertical plane as the one in which are pivotable crane boom 4 and jib 6), a pair of connecting rods 9, 10 articulating said link arm 8 to two upright retainment plates 11 and 12, respectively, arranged on the bracket 2. A traction spring 14 is held between the link arm 8 and the outer end 13 of the jib 6 to balance the latter. Between an attachment means 15 provided at the upper end of the crane boom 4 and a retainment plate 16 disposed in an upright position from the bracket 2 so as to extend above the shaft 3, is arranged a traction spring 17 balancing the crane boom 4.

A horizontal shaft 18 extends between the retainment plates 11, 12 and the lower end of a hydraulic cylinder 19 is pivotally mounted about said shaft, the piston rod of said cylinder having its outer (upper) end 21 articulated to a horizontal shaft 22 which extends through an articulation joint piece 23. The lower end of a hydraulic cylinder 24 is pivotally mounted about the same shaft 22, the piston rod 25 of said cylinder having its free (upper) end articulated to that section 26 of the jib 6 which extends rearwardly of the shaft 5.

The articulation piece 23 is provided with a conical portion 27 matching a correspondingly shaped conical portion 28 (FIG. 6) formed at the rear side of the crane boom 4. The conical portion 27 forms a transitional portion between the articulation piece 23 proper and a rod 29 which passes through vertical slits 30, 31 formed in the crane boom 4. The end of the rod 29 positioned opposite the articulation piece 23 is by means of a bolt 32 articulated to a double link 33a, 33b passing through two wall pieces 35, 36 secured to the crane boom 4. A horizontally extending shaft 38 with a lever 37 thereon is mounted in the wall piece 35 for turning movement and is provided with an eccenter part 39 which passes through the links 33a, 33b and a moveable washer 40 positioned between said links. The eccenter part 39 has a threaded end 41 passing freely through a washer 42 which is rotationally mounted in the wall piece 36. To the outer end of the shaft end 41 may be screwed a threaded sleeve 44 having a lever 43 thereon and serving as a clamping means, as will be described more in detail in the following.

The cylinders 19 and 24 are via conduits 45 and 46 connected to a hydraulic drive means. Between the connection points 47, 48 and 49, 50, respectively, to the cylinders 19 and 24 are inserted so-called by-pass valves 51 and 52, respectively.

FIG. 1 illustrates the robot in the position wherein it is ready to run through the chosen programme. The hydraulic cylinder 19 pivots the crane boom 4 into the intended positions of inclination of the latter and the hydraulic cylinder 24 pivots the jib 6 into the pre-determined positions of the latter. The means to move the "hand" with the tool in the tool attachment 7 do not form part of the present invention and for this reason will not be described herein.

To programme the robot, i.e. when the latter is to be moved manually through the movement pattern according to which the work is to be performed, it is, as indicated above, preferable to lessen the resistance to motion as much as possible in the various details of the robot, it being, however, necessary to ensure that the electrical encoding means — which are imagined inserted in or adjacent the pivot shafts 3 and 5 and associated with an electronic memory incorporated in the control system — transmit signals which indicate the angular movements of the crane boom 4 relative to the bracket 2 and the angular movements of the jib 6 relative to the crane boom 4. By disconnecting the cylinders 19 and 24 from the crane boom 4 they as well as their piston rods 20 and 25 are prevented from taking part in the movements of the crane boom 4 and the jib 6. The disconnection is effected in the following manner. By means of the lever 43 the shaft 38 and the double links 33a, 33b are released. When the lever 37 is thereafter pivoted to the position indicated in dash-and-dot lines in FIG. 4, the link 33a, 33b is swung in the clockwise direction about the bolt 34, whereby the rod 29 together with the articulation piece 23 are moved to the right (see the position indicated in das-and-dot lines in FIG. 4). The conical portion 27 on the articulation piece 23 then recedes from the conical ring portion 28 on the rear side of the crane boom 4. The crane boom 4 may now, as appears from FIG. 3, be swung in a vertical plane without any significant displacement of piston rod 20 relative to the cylinder 19 or any significant displacement of piston rod 25 relative to the cylinder 24. The rod 29 together with the articulation piece 23 pivot only about the bolt 32. As a consequence hereof and also as a result of the action of the balancing springs 14 and 17 the robot may be moved comparatively easily from its initial position to its final position and back.

After the programming operation the articulation piece 23 is again locked in the original position (FIG. 1). This is achieved by returning the shaft 38 by means of the level 37 to the original position (FIG. 1), wherein the eccenter part 39 pivots the link 33a, 33b back to the vertical position thereof (FIG. 4), whereupon the clamping sleeve 44 is tightened by means of the lever 43, the washer 42 clamping the link 33b against the washer 40 which in turn clamps the link 33a against the wall piece 35. As a result, the conical portion 27 of the articulation piece 23 thus is clamped in the annular portion 28.

The embodiment as illustrated and described is to be regarded as an example only and the various portions of the robot may be constructively altered in a variety of ways within the scope of the appended claims. The releasable locking of the articulation piece 23 to the crane boom 4 may be performed in a different manner than the one described above and illustrated in the drawings. It is possible to arrange for the articulation piece 23 to be completely separated from the crane boom 4 after the disconnection, such that the piston rod 20, upon demand, may form an obtuse angle with the cylinder 24 without necessitating an axial displacement between the piston rod and its associated cylinder.

What I claim is:

1. An improved industrial robot incorporating a control system, comprising a support, a bracket mounted for rotation relative to said support, a crane boom the lower end of which is pivotally mounted about a horizontal shaft on said bracket, a jib one end of which is pivotally mounted about a horizontal shaft provided at the upper end of said crane boom, a tool attachment means supported by said jib, a first hydraulic cylinder arranged between said bracket and said crane boom to pivot said crane boom in a vertical plane, and a second hydraulic cylinder arranged between said crane boom and said jib to pivot said jib in the same vertical plane, and a device incorporating a spring means to balance said crane boom and said jib, the improvement comprising an ariticulation piece mutually interconnecting said first and second hydraulic cylinders, said piece arranged to be disconnected from said crane boom upon programming of said control system and to be reconnected to said crane boom when said robot is to perform the operations in accordance with the chosen programme, a rod on said articulation piece, a first conical portion provided on said rod adjacent said articulation piece, a second conical portion of corresponding shape provided on said crane boom and arranged to be tightened into firm engagement with said first conical portion upon interconnection between said articulation piece and said crane boom.

2. An imporved industrial robot according to claim 1, the improvement comprising a link to one end of which is articulated the end of the rod opposite said articulation piece, the opposite link end articulated to said crane boom, a shaft provided with an eccenter part to effect pivotal movement of said link, a lever to rotate said shaft, and clamping means to retain said shaft in the desired position of rotation.

3. An improved industrial robot according to claim 1, the improvement comprising a slit in said conical portion in said crane boom, said slit extending in the longitudinal direction of said boom to allow passage through of said rod.

* * * * *